United States Patent [19]

Cox

[11] 4,377,896
[45] Mar. 29, 1983

[54] METHOD OF ASSEMBLING CONDUIT JOINT

[75] Inventor: Russell C. Cox, Borger, Tex.

[73] Assignee: Phillips Petroleum Company, Bartlesville, Okla.

[21] Appl. No.: 323,603

[22] Filed: Nov. 20, 1981

Related U.S. Application Data

[62] Division of Ser. No. 180,729, Aug. 25, 1980, Pat. No. 4,326,327, which is a division of Ser. No. 926,477, Jul. 20, 1978, Pat. No. 4,245,858.

[51] Int. Cl.³ .............................................. B23P 11/00
[52] U.S. Cl. ...................................... 29/437; 29/451; 29/455 R; 29/516; 264/242
[58] Field of Search ............... 264/249, 320, 322, 242; 29/434, 436, 450, 451, 455 R, 516, 437, 443; 285/21, 231, 158, 233, 302

[56] References Cited

U.S. PATENT DOCUMENTS

| | | | |
|---|---|---|---|
| 1,363,974 | 12/1920 | Heylman | 285/302 |
| 1,753,833 | 4/1930 | Mueller | 29/437 UX |
| 2,467,911 | 4/1949 | Reilly | 285/302 |
| 2,532,773 | 12/1950 | Kellam | 285/233 |
| 2,956,823 | 10/1960 | Benjamin, Jr. et al. | 285/351 X |
| 3,154,615 | 10/1964 | Cooprider | 264/242 |
| 4,023,831 | 5/1977 | Thompson | 285/302 |

FOREIGN PATENT DOCUMENTS

| | | | |
|---|---|---|---|
| 895505 | 5/1962 | United Kingdom | 285/302 |
| 969273 | 9/1964 | United Kingdom | 285/302 |

*Primary Examiner*—Charlie T. Moon

[57] ABSTRACT

The conduit structure comprises an outer tubular housing having a tubular inner member disposed therein with a first end of the inner member being positioned in the medial portion of the outer housing and retained therein by means of an outwardly extending flared portion on the first end of the tubular inner member which is constrained between two longitudinally spaced inwardly extending annular projections formed on the inner surface of the outer housing. A resilient annular seal is provided between the outer surface of the tubular inner member and the inner surface of the medial portion of the outer housing. The tubular inner member extends from one end of the outer housing and a second resilient annular seal is provided between the tubular member and said end of the outer housing. The tubular inner member is adapted for longitudinal, radial and rotational movement relative to the outer housing. An alternate form of conduit joint provides a second tubular inner member having one end secured and sealed within the medial portion of the outer housing in the same manner as the first tubular inner member and having the opposite end thereof extending from the second end of the outer housing. The two embodiments of the conduit joint can be combined as a single conduit joint assembly. A method of constructing the conduit joint from synthetic organic polymeric thermoplastic material is also disclosed.

4 Claims, 5 Drawing Figures

METHOD OF ASSEMBLING CONDUIT JOINT

This application is a division of copending application Ser. No. 180,729, filed Aug. 25, 1980, now Pat. No. 4,326,327, issued April 27, 1982, a division of application Ser. No. 926,477, filed July 20, 1978, now U.S. Pat. No. 4,245,858 issued Jan. 20, 1981.

The invention relates to a conduit. In one aspect the invention relates to a flexible conduit joint. In another aspect the invention relates to an article of manufacture formed, at least in part, of organic polymeric material. In still another aspect the invention relates to a process for manufacturing a conduit joint.

In the construction of buildings and other structures it is often necessary to provide ducts or conduits through the concrete walls thereof to provide an entrance point for utility services such as electrical lines, communication lines, etc. It is desirable for such ducts or conduits to be capable of accommodating seismic movement between the wall through which such ducts or conduits extend and the external duct or conduit through which such utility services are provided. Relative movement of this type must be planned for in areas where buildings or other structures are likely to be subjected to seismic movement, or where extremely rigid safety precautions must be taken to assure the integrity of electrical and communication lines to certain facilities such as modern electrical power generation stations.

Recently the construction industry has placed increased reliance on utility service ducts constructed or organic polymeric materials, and more particularly polyethylene thermoplastic material, due to its light weight, chemical stability, toughness, strength, electrical nonconductance, corrosion resistance and other desirable physical and economic advantages over other materials such as steel or other metals. Accordingly, it is an object of the present invention to provide a novel conduit structure.

Another object of the invention is to provide a flexible conduit joint for communicating between the inside and the outside of a wall.

Still another object of the invention is to provide a conduit joint for connection with a utility service conduit to provide passage of the utility service lines through a wall structure while accommodating relative motion between the wall and the utility service conduit.

Another object of the invention is to provide a flexible conduit joint which can maintain the integrity of a passage for utility lines when subjected to seismic movement.

Yet another object of the invention is to provide a novel flexible conduit joint formed of organic polymeric material.

Another object of the invention is to provide a method for constructing a novel flexible conduit joint.

Other objects, aspects and advantages of the invention will be apparent from a study of the specification, appended claims and drawings in which:

Figure 1:
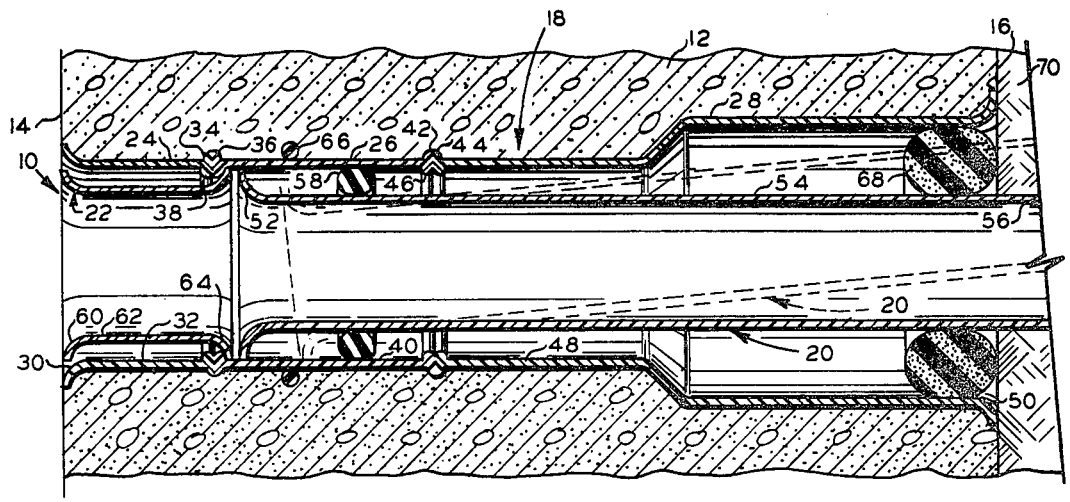
FIG. 1 is a cross-sectional view taken along the center line of a conduit joint constructed in accordance with the present invention showing its installation in a wall structure and illustrating in dashed lines the relative movement between components of the joint to accommodate seismic movement.

Referring now to the drawings, and of FIG. 1 in particular, a flexible conduit joint constructed in accordance with the present invention is illustrated therein and is generally designated by the reference character 10. The joint 10 is shown encased in a concrete building foundation 12 through which it extends providing communication between the inner wall 14 and outer wall 16 of the foundation.

The conduit joint 10 comprises a tubular outer housing 18 and first and second tubular inner housings 20 and 22. The outer housing 18 comprises a first end portion 24, an intermediate or medial portion 26 and a second end portion 28. The first end of the outer housing 18, formed by the first end 30 of the first end portion 24, is preferably radially outwardly flared to provide a smooth transition between the inner surface 32 of the first end portion 24 and the inner wall 14 of the foundation 12. The second end 34 of the first end portion 24 and the first end 36 of the intermediate portion 26 are coaxially aligned and suitably secured together in abutting relation, and a radially inwardly extending annular projection or wall 38 is formed at this juncture which extends radially inwardly from the inner surface 32 of the first end portion 24 and the inner surface 40 of the intermediate portion 26. The second end 42 of the intermediate portion 26 and the first end 44 of the second end portion 28 are also coaxially aligned and fixedly secured together in abutting relation, and a second radially inwardly extending annular projection 46 is formed at this juncture and extends radially inwardly from the inner surface 40 and the inner surface 48 of the second end portion 28 of the outer housing 18. The second end of the outer housing 18, formed by the second end 50 of the second end portion 28, is also radially outwardly flared to form a smooth transition between the outer housing 18 and the outer wall 16. It should be understood, however, that the outwardly flared portion of the second end 50 can be omitted if desired.

The outer housing 18 is preferably formed of a synthetic organic polymeric thermoplastic material capable of being fusion welded, preferably a polymer of at least one alpha-monoolefin, and more preferably high density polymer of ethylene. The connections between the ends 34 and 36 of the first end and intermediate portions 24 and 26 and between the ends 42 and 44 of the intermediate and second end portions 26 and 28 of the outer housing 18 are preferably formed by butt-fusion-welding the respective tubular portions together thus forming at each fusion joint an interior, radially inwardly extensing upset ring which forms a respective one of the annular projections 38 and 46. Butt-fusion-welding of tubular members of organic polymer material requires the heating of the ends of the members to be joined, the axial movement of the members together until the heated ends are in contact, the further axial movement of the members together until the radially inwardly extending upset ring is formed at the fusion joint, and then the cooling of the resulting fusion-welded joint.

The first tubular inner member 20 is provided with a radially outwardly extending flared first end portion 52 which forms an annular wall or projection extending outwardly from the outer surface 54 of the inner member 20, the outer diameter of this annular wall being greater than the inner diameter of the second annular projection 46 thus physically limiting the movement of the inner member 20 to the right relative to the outer housing 18 as viewed in FIG. 1. The second end portion 56 of the inner member 20 extends from the outer housing 18 beyond the second end 50 thereof any suitable distance where it can be connected to another conduit member (not shown) by suitable means such as fusion welding, cementing, mechanical coupling or the like. A resilient annular seal 58, preferably an elastomeric or synthetic resin O-ring, is positioned about the outer surface 54 of the inner member 20 intermediate the first end portion 52 thereof and the second annular projection 46 of the outer housing 18. The resilient annular seal 58 provides a seal between the outer surface 54 of the inner member 20 and the inner surface 40 of the intermediate portion 26 of the outer housing 18. This annular seal permits longitudinal, radial and rotational relative movement between the inner member 20 and the outer housing 18 while maintaining the seal between these elements intact.

The second tubular inner member 22 is provided with a radially outwardly flared first end portion 60 which provides a smooth transition between the inner surface 62 of the inner member 22 and the inner wall 14 of the foundation 12. The second end portion 64 of the inner member 22 is also provided with a radially outwardly extending flared portion which is closely receive within the cylindrical inner surface 40 of the intermediate portion 26 and is engaged by the annular projection 38 to retain the second inner member 22 within the outer housing 18 in substantial coaxial alignment therewith. The inner diameter of the second inner member 22 is preferably slightly greater than the inner diameter of the first inner member 20 to provide a smooth transition between the interior of the first inner member 20 and the interior of the building beyond the inner wall 14. The second inner member 22 also provides a fitting into which an additional tubular member (not shown), of diameter and wall thickness substantially identical to that of the first inner member, can be received to provide an additional conduit extending away from the inner wall 14 if desired. One or more O-rings (not shown) can be positioned between the outer surface of the additional tubular member and the inner surface 62 of the second inner member 22 to provide a friction connection therebetween.

It will be noted that the second end portion 28 of the outer housing 18 is provided with a bell-shaped enlargement in order to accommodate relatively large amounts of radial displacement of the first inner member 20 relative to the outer housing 18. Such relative radial displacement as well as relative longitudinal displacement between the first inner member 20 and the outer housing 18 is illustrated by means of dashed lines in FIG. 1.

The flexible conduit joint 10 is also preferably provided with a resilient annular seal 66, preferably an elastomeric or synthetic resin O-ring, disposed about the outer surface of the outer housing 18 to provide a waterstop between the outer housing and the concrete foundation 12. A resilient or flexible annular seal 68 is also preferably positioned intermediate the outer surface 54 of the inner member 20 and the inner surface 48 of the second end portion 28 of the outer housing 18 adjacent the second end 50 thereof.

The resilient or flexible annular seal 68 is preferably formed of a relatively flexible, light weight foam rubber or foam synthetic resinuous material which can be readily deformed to accommodate radial motion of the inner member 20 relative to the outer housing 18. It is a function of the resilient or flexible annular seal 68 to prevent the introduction of rocks and dirt into the annular space between the inner member 20 and the outer housing 18 when such material is back filled as shown at 70 adjacent the outer wall 16 of the foundation 12 and about the conduit 20. The resilient or flexible annular seal 68 can also be formed of a relatively easily deformed mastic. It may also be desirable to prevent the introduction of rocks and soil into the conduit joint by means of a flexible boot (not shown) disposed about the inner member 20 and communicating between the outer surface thereof and the second end 50 of the outer housing 18.

Figure 2:
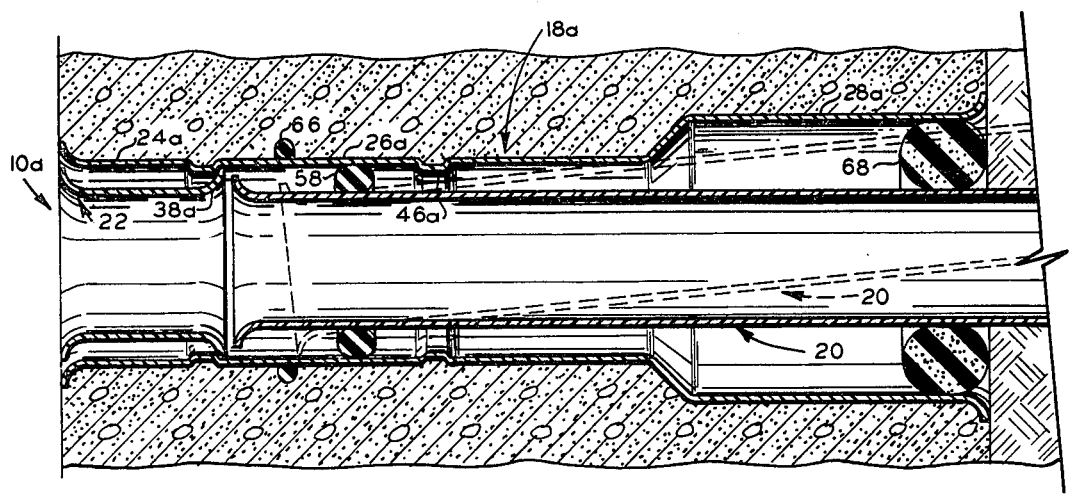
FIG. 2 is a cross-sectional view similar to FIG. 1 illustrating a slightly modified conduit joint constructed in accordance with the present invention.

Referring now to FIG. 2, there is illustrated a slightly modified flexible conduit joint designated by the reference character 10a. Elements of the conduit joint 10a which are common to previously described conduit joint 10 carry the same reference characters. The conduit joint 10a is characterized by the employment of a one-piece outer housing 18a. The outer housing 18a is provided with a first end portion 24a, and intermediate portion 26a and a second end portion 28a. The first end portion 24a is separated from the intermediate portion 26a by a radially inwardly projecting annular wall 38a in the form of an integral corrugation in the outer housing 18. Similarly, the intermediate portion 26a is separated from the second end portion 28a by a second radially inwardly projecting annular projection 46a formed in the same manner as the annular projection 38a. The outer housing 18a is preferably formed of a synthetic organic polymeric material capable of being permanently deformed upon the application of sufficient heat and pressure thereto. Suitable materials include alpha-monoolefin polymers, of which high density polymers of ethylene are preferred materials. The annular projections 38a and 46a can be suitably formed by applying a desired amount of heat about the circumference of the outer housing 18a at the desired locations and then deforming or squeezing the outer periphery of the outer housing radially inwardly by suitable circumferential clamp means to form the annular projections 38a and 46a as shown in FIG. 2 upon cooling of the polymeric material. The remaining structure of the conduit joint 10a is identical to that described above for the conduit joint 10.

Figure 3:
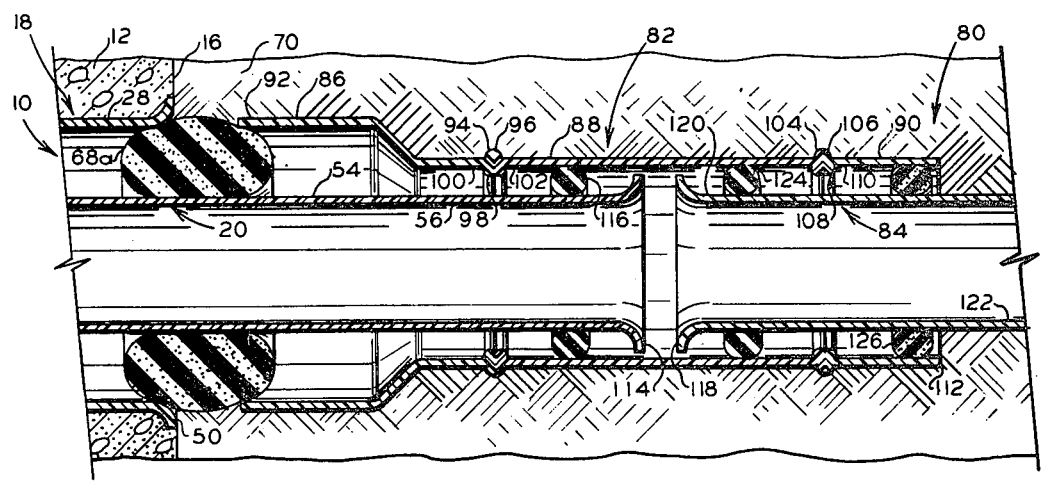
FIG. 3 is a cross-sectional view taken along the centerline of another embodiment of a conduit joint constructed in accordance with the present invention.

Referring now to FIG. 3, an additional flexible conduit joint structure generally designated by the reference character 80 is illustrated connected to the second end portion 56 of the first tubular inner member 20 of the flexible conduit joint 10. As so connected the flexible conduit joints 10 and 80 form a conduit joint assembly.

The conduit joint 80 comprises a tubular outer housing 82 and a first tubular inner member 84. The outer housing 82 comprises a first end portion 86, an intermediate or medial portion 88 and a second end portion 90. The first end of the outer housing 82 formed by the first end 92 of the first end portion 86 is preferably bell-shaped, forming an opening having a diameter substantially equal to the diameter of the opening in the second end 50 of the conduit joint 10. A slightly modified resilient or flexible annulr seal 68a is disposed about the second end portion 56 of the first tubular inner member 20 and is received within the openings in the second end 50 of the outer housing 18 and in the first end 92 of the outer housing 82. The annular seal 68a is preferably constructed of one of the materials previously described for the resilient or flexible annular seal 68, and serves to prevent the introduction of rocks and soil from the backfill 70 between the outer housings 18 and 82 and the tubular inner member 20 while still permitting maximum relative movement between these elements.

The second end 94 of the first end portion 86 and the first end 96 of the intermediate portion 88 are suitably secured together in abutting relation and a radially inwardly extending annular projection or wall 98 is formed at this juncture which extends radially inwardly from the inner surface 100 of the first end portion 86 and the inner surface 102 of the intermediate portion 88. The second end 104 of the intermediate portion 88 and the first end 106 of the second end portion 80 are also fixedly secured together in abutting relation and a second radially inwardly extending annular projection or wall 108 is formed at this juncture and extends radially inwardly from the inner surface 102 and the inner surface 110 of the second end portion 90 of the outer housing 82. The second end of the outer housing 82, formed by the second end 112 of the second end portion 90 is cylindrically shaped, however, it should be understood that the second end 112 can be bell-shaped or outwardly flared if desired.

The outer housing 82 is preferably formed of a synthetic organic polymeric thermoplastic material capable of being fusion welded, preferably a polymer of an alpha-monoolefin, and more preferably a high density polymer of ethylene. The connections between the ends 94 and 96 of the first end and intermediate portions 86 and 88 and between the ends 104 and 106 of the intermediate and second end portions 88 and 90 of the outer housing 82 are preferably formed by butt-fusion-welding the respective tubular portions together, as described above, thus forming at each fusion joint an interior, radially inwardly extending upset ring which forms a respective one of the annular projections 98 and 108.

The second end portion 56 of the inner member 20 extends beyond the second end 50 of the outer housing 18 of the conduit joint 10 and terminates at the second end thereof in a radially outwardly extending flared portion 114 which forms an annular wall or projection extending outwardly from the outer surface 54 of the inner member 20, the outer diameter of the annular wall 114 being greater than the inner diameter of the annular projection 98, thus physically limiting the movement of the inner member 20 to the left relative to the outer housing 82 as viewed in FIG. 3. A resilient annular seal 116, preferably an elastomeric or synthetic O-ring, is positioned about the outer surface 54 of the inner member 20 intermediate the flared second end 114 and the annular projection or wall 98 of the outer housing 82. The resilient annular seal 116 provides a seal between the outer surface 54 of the inner member 20 and the inner surface 102 of the intermediate portion 88 of the outer housing 82. This annular seal permits longitudinal, radial and rotational relative movement between the inner member 20 and the outer housing 82 while maintaining the seal between these elements intact.

The tubular inner member 84 is provided with a radially outwardly flared first end portion 118 which forms an annular wall or projection extending outwardly from the outer surface 120 of the inner member 84, the outer diameter of the annular wall 118 being greater than the inner diameter of the second annular projection or wall 108 thus physically limiting the movement of the inner member 84 to the right relative to the outer housing 82 as viewed in FIG. 3. The second end portion 122 of the inner member 84 extends from the outer housing 82 beyond the second end 112 thereof any suitable distance where it can be connected to another conduit member (not shown) by suitable means such as fusion welding, cementing, mechanical coupling or the like. A resilient annular seal 124, preferably an elastomeric or synthetic resin O-ring, is positioned about the outer surface 120 of the inner member 84 intermediate the first end portion 118 thereof and the second annular projection or wall 108 of the outer housing 82. The resilient annular seal 124 provides a seal between the outer surface 120 of the inner member 84 and the inner surface 102 of the intermediate portion 88 of the outer housing 82. The annular seal 124 permits longitudinal, radial and rotational relative movement between the inner member 84 and the outer housing 82 while maintaining the seal between these elements intact.

A resilient or flexible annular seal 126 is preferably positioned intermediate the outer surface 120 of the inner member 84 and the inner surface 110 of the second end portion 90 of the outer housing 82 adjacent the second end 112 thereof. The resilient or flexible annular seal 126 is preferably formed of a relatively flexible lightweight foam rubber or foam synthetic resinous material which can be readily deformed to accommodate radial motion of the inner member 84 relative to the outer housing 82. It is a function of the resilient or flexible annular seal 126 to prevent the introduction of rocks and dirt into the annular space between the inner member 82 and the outer housing 82 when such material is backfilled as shown at 70 about the second end 112 of the outer housing 82 and about the second end portion 122 of the tubular inner member 84. The resilient or flexible annular seal 126 can also be formed of a relatively easily deformed mastic. It may also be desirable to prevent the introduction of rocks and soil into the conduit joint by means of a flexible boot (not shown) disposed about the inner member 84 and communicating between the outer surface 120 thereof and the second end 112 of the outer housing 82.

Figure 4:
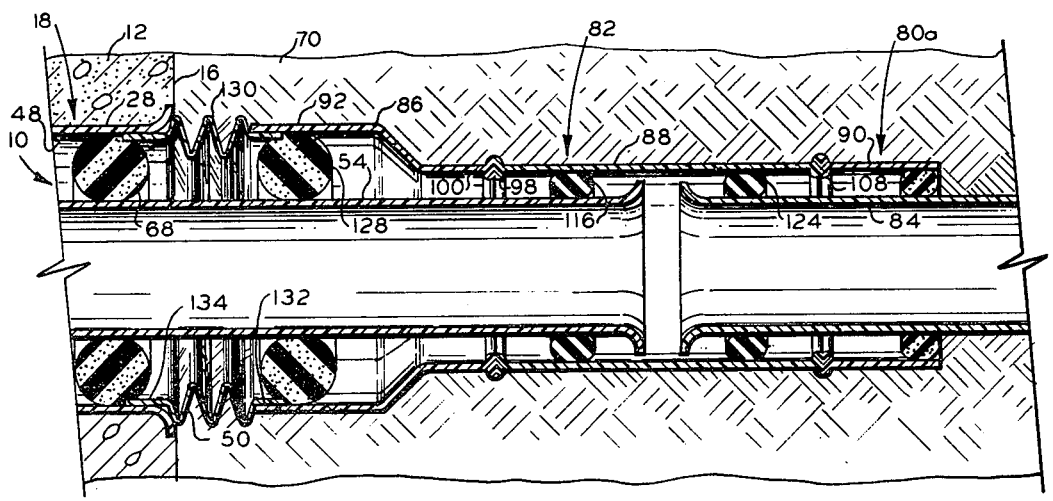
FIG. 4 is a cross-sectional view similar to FIG. 3 illustrating an alternate embodiment of a conduit joint constructed in accordance with the present invention.

Referring now to FIG. 4, there is illustrated a slightly modified flexible conduit joint 80a which differs only slightly from the previously described conduit joint 80. Elements of the conduit joint 80a which are common to the previously described conduit joint 80 carry the same reference characters.

The first end portion 86 of the tubular outer housing 82 of the conduit joint 80a carries a resilient or flexible annular seal 128 within the first end 92 thereof which is sealingly disposed between the inner surface 100 of the first end portion 86 and the outer surface 54 of the tubular inner member 20. The annular seal 128 is preferably constructed of one of the materials previously described for the resilient or flexible annular seal 68 which is positioned intermediate the outer surface 54 of the inner member 20 and the inner surface 48 of the second end portion 28 of the outer housing 18. A flexible, generally cylindrically shaped, corrugated boot 130 communicates between the first end 92 of the outer housing 82 and the second end 50 of the outer housing 18. As illustrated in FIG. 4, the opposite ends 132 and 134 of the boot 130 are received respectively within the ends 92 and 50 of the outer housings 82 and 18. The boot 130 can be suitably formed of an organic polymeric material capable of being permanently deformed upon the application of sufficient heat thereto. Suitable materials for the construction of the boot include alpha-monoolefin polymers, of which high density polymers of ethylene are preferred materials. The boot can also be constructed of an elastomeric material or a metallic material as long as the selected material provides sufficient strength and flexibility to prevent the introduction of rocks and soil from the backfill 70 into the annular space between the ends of the outer housings and the tubular inner member 20 extending therethrough without adversely restricting movement of the conduit joint structure. The boot can be secured to one or both of the outer housings by means of fusion welding, cementing, mechanical interconnection or the like. When using the boot 130, one or both of the flexible or resilient annular seals 68 and 128 can be omitted if desired.

Figure 5:
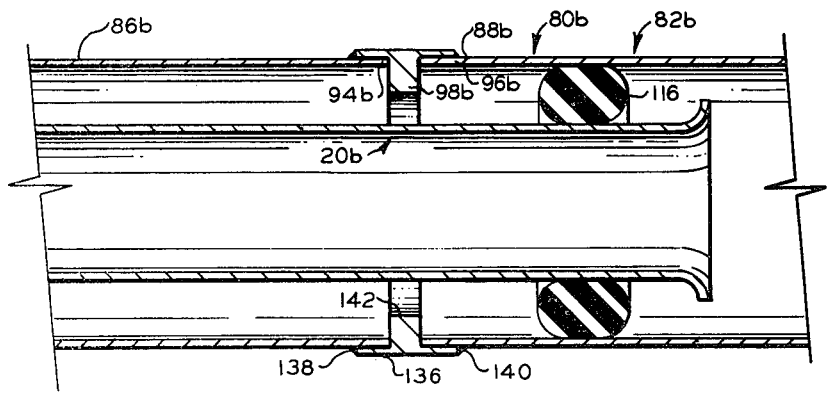
FIG. 5 is a partial, cross-sectional view of a conduit joint in accordance with the present invention and illustrating the construction thereof when employing metallic elements.

Referring now to FIG. 5, there is illustrated a portion of a modified conduit joint structure 80b which comprises a modified tubular outer housing 82b constructed of metallic members formed of steel or the like. The outer housing 82b comprises a first end portion 86b and an intermediate or medial portion 88b. The second end 94b of the first end portion 86b and the first end 96b of the medial portion 88b are secured respectively to an annular member 98b which is substantially T-shaped in cross-section. The outer portion 136 of the annular member 98b is secured respectively to the first end portion 86b and the medial portion 88b by means of annular welds 138 and 140. The inner portion 142 of the annular member 98b provides structure equivalent to the annular projection or wall 98 described above for the flexible conduit joints 80 and 80a.

The outer housing structure 82b can be employed with a suitable tubular inner member 20b which can be constructed of a tubular metallic material such as steel as shown in FIG. 4 or of a suitable tubular polymeric material as described above. Similarly, the resilient annular seal 116 can be employed to achieve a seal between the outer surface of the tubular inner member 20b and the inner surface of the medial portion 88b in the same manner as described above for the flexible conduit joints 80 and 80a.

It is presently preferred to assemble the flexible conduit 10 illustrated in FIG. 1 in the following manner. Initially, all flared and bell-shaped end portions are preferably formed on the first and second end portions 24 and 28 of the tubular outer housing 18, on the first and second end portions 60 and 64 of the second tubular inner member 22, and on the first end portion 52 of the first tubular inner member 20 by suitable means such as by heating each end portion to be flared, physically deforming each said end portion to achieve the desired contour, and then allowing each said end portion to cool in the desired flared configuration. The intermediate or medial portion 26 is then coaxially aligned with the second end portion 28, and the end face of the second end portion 42 of the medial portion 26 and the end face of the first end portion 44 of the second end portion 28 are heated to their fusion temperature by suitable heating means such as a direct heating plate contacting both end faces. The heating means is then removed and the heated and faces are moved axially together to concurrently form a butt-fusion-weld therebetween and an annular upset which, in turn, forms the second radially inwardly extending annular projection or wall 46. The resilient annular seal 58 is then installed around the outer surface of the first tubular inner member 20 adjacent the flared first end portion 52 thereof, and the second end portion 56 of the inner member 20 is inserted into the first end portion 36 of the medial portion 26 with the inner member 20 being telescoped from left to right as viewed in FIG. 1 within the fusion-welded medial and second end portions 26 and 28 until the seal 58 contacts both the second annular projection 46 of the outer housing 18 and the flared first end portion 52 of the inner member 20.

The intermediate or medial portion 26 is then coaxially aligned with the first end portion 24, and the end face of the second end 34 of the first end portion 24 and the end face of the first end 36 of the medial portion 26 are heated to their fusion temperature by suitable heating means such as a direct heating plate contacting both end faces. The heating means is then removed, the second tubular inner member 22 is positioned concentrically within the first end portion 24 of the outer housing 18 with second end portion 64 of the inner member 22 extending into the medial portion 26, and the heated end faces are moved axially together to concurrently form a butt-fusion-weld therebetween and an annular upset which, in turn, forms the first radially inwardly extending annular projection or wall 38 which retains the second tubular inner member 22 within the first end portion 24 with the flared second end portion 64 of the second inner member 22 retained in the space between the inwardly projecting annular walls 38 and 46. Similarly, the first end portion 52 of the first tubular inner member 20 and the resilient annular seal 58 are retained in the space between the inwardly projecting annular walls 38 and 46. The resilient annular seal 68 is then positioned intermediate the outer surface of the first tubular inner member 20 and the inner surface of the second end portion 28 of the outer housing 18 adjacent the second end 50 of the outer housing 18 to complete the construction of the flexible conduit joint 10.

The order of assembly of the flexible conduit joint 10a is substantially identical to that described above for the flexible conduit joint 10 except that a one-piece outer housing 18a is employed which eliminates the necessity of coaxially aligning the first end portion, medial portion and second end portion and subsequently butt-fusion-welding these elements together. In the flexible conduit joint 10a, the annular projection 38a is formed by applying a desired amount of heat about the circumference of the outer housing 18a subsequent to the positioning of the second tubular inner member 22 therein as shown in FIG. 2 and then applying circumferential, radially inward force to the softened outer housing to secure the inner member 22 in the outer housing 18a. Similarly, the annular projection 46a is formed by applying a desired amount of heat about the circumference of the outer housing 18a at the desired location subsequent to the positioning of the first tubular inner member 20 and annular resilient seal 58 within the intermediate or medial portion 26a and then applying circumferential, radially inward force to the softened outer housing to secure the inner member 20 in the outer housing 18a.

The flexible conduit joints 80 and 80a can each be assembled by positioning the elements thereof as illustrated in FIGS. 3 and 4 and butt-fusion-welding the abutting ends of the elements of the tubular outer housing 82 to form the annular projections or walls 98 and 108. It will be understood that the outer housings of the conduit joints 80 and 80a can each be formed from one piece of tubing of synthetic organic polymeric thermoplastic material with the annular projections 98 and 108 being formed utilizing the same technique described above for the flexible conduit joint 10a.

It will also be understood that the tubular inner members and outer housings can be of circular, rectangular, square or other non-circular configuration, although for most applications the circular configuration is more preferable.

Other reasonable variations and modifications are possible within the scope of the foregoing disclosure, the drawings and the appended claims to the invention.

What is claimed is:

1. A method of assembly of a conduit joint having a unitary tubular outer housing formed of thermoplastic material capable of being permanently deformed upon application of sufficient heat and pressure thereto comprising a medial portion and first and second opposite end portions, a first tubular inner member having at least one flared end, and a resilient annular seal, comprising the steps of:

positioning said first inner member within the second end portion of said outer housing with the at least one flared end of said first inner member extending into the medial portion of said outer housing with said annular resilient seal disposed between said first inner member and the medial portion of said outer housing to provide a seal therebetween;

deforming said outer housing inwardly intermediate the medial portion and the second end portion thereof so as to form an inwardly extending projection intermediate said annular resilient seal and the second end portion of said outer housing and engageable with said annular resilient seal to retain both said annular resilient seal and said first inner member within said outer housing;

positioning a second tubular inner member having opposite flared ends within the first end portion of said outer housing with one flared end of said second inner member positioned within the medial portion of said outer housing; and deforming said outer housing inwardly intermediate the medial portion and the first end portion thereof so as to form an inwardly extending projection intermediate said one flared end of said second inner member and the first end portion of said outer housing and engageable with said one flared end of said second inner member to retain said second inner member within said outer housing.

2. A method in accordance with claim 1 wherein said deforming step includes applying sufficient heat to a portion of said outer housing about the outer periphery thereof, deforming the thus heated portion of said outer housing inwardly to form an inwardly extending projection, and allowing said thus deformed portion to cool so as to form a permanent deformation in said outer housing.

3. A method of assembly of a conduit joint having a unitary tubular outer housing formed of organic polymeric material capable of being permanently deformed upon application of sufficient heat and pressure thereto and comprising a medial portion and first and second opposite end portions, a first tubular inner member having at least one flared end, a second tubular inner member having opposite flared ends, and a resilient annular seal, comprising the steps of:

positioning said first inner member within the second end portion of said outer housing with the flared end of said first inner member extending into the medial portion of said outer housing with said annular resilient seal disposed between said first inner member and the medial portion of said outer housing to provide a seal therebetween;

positioning said second inner member within the first end portion of said outer housing with one flared end of said second inner member positioned within the medial portion of said outer housing;

deforming said outer housing radially inwardly intermediate the medial portion and the first end portion so as to form a radially inwardly extending projection engageable with the one flared end of said second inner member positioned within the medial portion to secure said second inner member within said outer housing; and deforming said outer housing radially inwardly intermediate the medial portion and the second end portion thereof so as to form a radially inwardly extending projection engageable with said annular resilient seal to secure both said annular resilient seal and said first inner member within said outer housing.

4. A method in accordance with claim 3 wherein each deforming step includes applying sufficient heat to said outer housing about the circumference thereof, deforming the heated portion of said outer housing radially inwardly to form a radially inwardly extending projection, and allowing said deformed portion to cool so as to form a permanent deformation in said outer housing.

* * * * *